United States Patent [19]

Kodama et al.

[11] 4,279,952
[45] Jul. 21, 1981

[54] MULTILAYER INSULATING MATERIAL AND PROCESS FOR PRODUCTION THEREOF

[75] Inventors: Fumio Kodama, Chofu; Noboru Ohyama, Iwaki, both of Japan

[73] Assignee: Kureha Kagaku Kogyo Kabushiki Kaisha, Japan

[21] Appl. No.: 965,242

[22] Filed: Nov. 27, 1978

[30] Foreign Application Priority Data

Dec. 14, 1977 [JP] Japan .................. 52/167826[U]

[51] Int. Cl.³ .............................................. D04H 1/08
[52] U.S. Cl. ......................................... 428/36; 13/35;
156/89; 156/155; 264/29.5; 423/447.2;
423/448; 428/218; 428/244; 428/280; 428/281;
428/282; 428/408
[58] Field of Search ............... 428/280, 286, 284, 282,
428/408, 36, 218, 300, 301, 283, 244; 264/29.1,
29.5; 156/60, 89, 155; 423/447.2, 448; 13/35

[56] References Cited

U.S. PATENT DOCUMENTS

| 3,404,061 | 10/1968 | Shane et al. | 428/408 |
| 3,579,401 | 5/1971 | Cauville et al. | 428/280 |
| 3,607,541 | 9/1971 | Tombrel | 428/408 |
| 3,844,877 | 10/1974 | Wessendorf et al. | 428/408 |
| 3,956,548 | 5/1976 | Kovoc et al. | 428/282 |
| 3,980,105 | 9/1976 | Myskowski | 428/218 |
| 3,991,248 | 11/1976 | Bauer | 428/408 |
| 4,029,829 | 5/1977 | Weaver et al. | 428/218 |

Primary Examiner—James J. Bell
Attorney, Agent, or Firm—Wenderoth, Lind & Ponack

[57] ABSTRACT

By bonding a graphite sheet possessing tightness to at least one surface of carbon fiber felt sheet possessing gas permeability by means of a carbonaceous binder, a multilayer thermally insulating material suitable for use in a heating furnace employing a nonoxidizing atmosphere is obtained. This insulating material has mechanical strength which does not decrease with a long period of use and gives rise to little contamination of articles being heated in the furnace.

14 Claims, 8 Drawing Figures

MULTILAYER INSULATING MATERIAL AND PROCESS FOR PRODUCTION THEREOF

BACKGROUND OF THE INVENTION

This invention relates generally to heat insulating materials and structures for heating furnaces. More particularly, the invention relates to insulating materials and structures (hereinafter referred to generally as "insulating materials") suitable for use in heating furnaces in which nonoxidizing atmosphere such as a vacuum, an inert gas, or a reducing gas is used for purposes such as heat treatment of metals such as hardening, annealing, and brazing of metals, sintering of powdered alloys, evaporation deposition of metals, refining of electrolytic alumina, and melting of quartz.

The affixing of insulating materials on the inner wall surfaces of high-temperature heating furnaces for the purpose of maintaining the furnace interior temperatures is being practiced. As insulating materials for this purpose, materials such as bricks of graphite powder or alumina have heretofore been used, but it is difficult with these materials to obtain uniform thermal insulating property. Particularly in the case of a heating furnace to operate with a nonoxidizing atmosphere which requires a construction for isolating that atmosphere from the outside air, this work of installing the insulating material is very complicated and troublesome. Because of this problem, there has been a trend in recent years toward wide use, as insulating materials, of inorganic fibers of excellent heat resistance such as carbon fibers, ceramic fibers, slag fibers, and rock wool which have been formed into a bulky felt.

Inorganic fiber felts possess flexibility and are available in forms of almost uniform thickness. For these reasons, these felts are widely recognized as having useful features such as facility in securing to the inner wall surface of furnaces and in obtaining positive heat insulation effect, and short times for temperature rise and cooling due to their bulkiness and small heat capacity. However, it has been found that these inorganic fiber felts are accompanied by a number of problems in practical use which still require solutions.

More specifically, for persons concerned with enlarging as much as possible the uniform heating zones of heating furnaces thereby to elevate their capacities to process the materials being processed, there have been three typical points relative to which improvement in felt insulating materials has been desired, namely, (1) causing the felt to possess self-standing property, (2) eliminating fluff or nap of the felt, and (3) imparting tightness to the outer surfaces of the felt.

The lack of self-standing property in a felt necessitates the installation of a large number of supporting structures within the furnace in order to hold the felt in installed state at the inner surface of the furnace wall. This gives rise to a reduction of the processing space within the furnace and variations in the thickness and density of the felt due to the affixing thereof to the supporting structures, whereby the effective uniform heating zone within the processing space is reduced. This has been a source of dissatisfaction among persons concerned. The formation of fluff must be prevented because its scattering will become a cause of contamination of the material being processed.

Furthermore, tightness of the outer surfaces of the felt is interrelated to the serviceable life of the insulating material. More specifically, particularly in the case where a vacuum melting furnace or a vacuum evaporation deposition furnace is used, the material being melted sometimes undergoes bumping and, being scattered around the periphery of the crucible, adheres to the insulating material, or vaporized metal settles on the insulating material in some cases. However, the scattered material not only adheres in this manner to the surface of the felt but infiltrates through the gaps between the fibers and penetrates even into the inner layers of the felt. Parts of the felt to which the process material thus adheres undergo a remarkable decrease in mechanical strength and thereby readily fall off upon being subjected to impact or abrasion.

This vulnerability of the felt gives rise to results which are undesirable from the viewpoint of practical use of the felt as an insulating material, such as a great reduction the serviceable life thereof and a disturbance of the heat insulating property which causes temperature irregularities.

In order to overcome these difficulties accompanying the inorganic fiber felts known heretofore, one of the inventors of this invention has previously invented a process for producing a formed insulating material by impregnating a carbon fiber felt with thermosetting resin which is carbonizable and carbonizing this resin after modling and setting. By this process (as disclosed in Japanese Patent Publication No. 35930/1975) there is obtained an insulating material in which scattering of fluff of the carbon fiber felt is prevented, and the felt is self-supporting.

As a result of research carried out by the inventors of this invention, however, it has been found that the above described formed insulating material of impregnated carbon fiber felt is still accompanied by a number of problems.

More specifically, a formed insulating material obtained in the above described manner still has a bulk density of the order of only 0.11 to 0.13 grams/cm$^3$., and while it can be said to be self-supporting, its prevention of release of fluff and improvement of the surface-tightness are inadequate. For this reason, the surface of the formed insulating material is worn away by contact and abrasion when the process material is being charged into or taken out of the furnace or by erosion caused by high-velocity gas flow due to the flowing out and in of ordinary nonoxidizing gas such as displacement and discharge of gas within the furnace or introducing of cooling gas carried out during the operation of a vacuum furnace. To date there has been no formed insulating material in which this erosion and scattering of the felt fluff can be prevented.

Furthermore, since the surface-tightness of this molded insulating material is inadequate, the deterioration of the insulating material due to scattering, adherence, and penetration of the process material has been almost unavoidable. This problem can be overcome to some extent by increasing the quantity of the carbonaceous binder to increase the tightness of the felt surface. However, the carbonaceous binder, which has been obtained by carbonization of a thermosetting resin, has, itself, low strength, is fragile, and is readily pulverized, and even if scattering of fluff can be prevented, there is the possibility of increase in the scattering of powder of the binder itself. Still another problem is that, in order to increase the quantity of the binder, it is necessary to impregnate the felt with a very large quantity of the resin which is the precursor of the binder, but in this case also, at the time of carbonization after forming, a volumetric shrinkage corresponding to the carbonization rate of that resin occurs, and the shape of the entire formed insulating material becomes deformed.

That is, according to the results of our study, it can be said that the thermally insulating characteristic and the above mentioned three requirements of self-standing property, prevention of napping or fluffing, and surface-tightness cannot all be satisfied by a single layer of insulating material.

As a result of our further research based on this knowledge, we have observed that a graphite sheet has excellent surface-tightness and, at the same time, has the capability of being impregnated with the above described carbonaceous binder or its precursor, the carbonizable resin. We have found further that, accordingly: a graphite sheet can be strongly bonded to a carbon fiber felt by a carbonaceous binder of this character; the multilayer insulating material obtained in this manner fully satisfies the above stated required characteristics of an insulating material; and, by bonding a graphite sheet on the surface, radiation heat is shielded off, and the adiabatic efficiency is raised by approximately 20 percent (i.e., the required heating energy is reduced by approximately 20 percent).

SUMMARY OF THE INVENTION

It is an object of this invention to provide an insulating material for use in heating furnace wherein nonoxidizing atmospheres are used, the insulating material having in combination heat insulating property, fluff preventing property, self-standing property, and surface-tightness.

Another object of the invention is to provide a process for producing the above described insulating material.

More specifically, according to this invention in one aspect thereof, briefly summarized, there is provided a multilayer insulating material which is suitable for use in heating furnaces wherein nonoxidizing atmospheres are used and which is characterized by the combination of a carbon fiber felt sheet possessing gas permeability, a carbonaceous binder, and a graphite sheet possessing tightness or gastightness and bonded by the carbonaceous binder to at least one surface of the carbon fiber felt sheet.

Furthermore, according to this invention in another aspect thereof, briefly summarized, there is provided a process for producing the multilayer insulating material of this invention, which process is characterized by steps comprised of:

(1) bonding a graphite sheet possessing tightness to at least one surface of a carbon fiber felt sheet possessing gas permeability over and through a carbonizable resin interposed therebetween thereby to obtain a bonded structure; and (2) carbonizing the carbonizable resin of the bonded structure thus obtained.

The above set forth objects, other objects, and further features of this invention will be apparent from the following detailed description with respect to preferred embodiments of the invention when read in conjunction with the accompanying drawings, which are briefly described below, and throughout which like parts are designated by like reference numerals.

Figure 1:
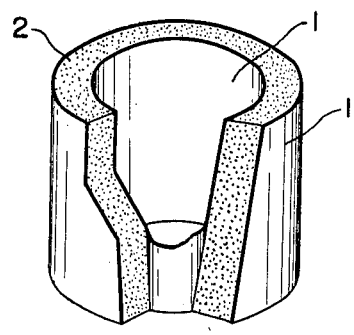
FIGS. 1, 3, 5, and 7 are perspective views, with parts cut away, respectively showing different examples of hollow cylindrical formed structures of the multi-layer formed insulating material according to this invention.

These flat-plate-shaped structures are used as insulating material of rectangular furnaces by assembling the material as basic material into shapes of rectangular columns or boxes.

DETAILED DESCRIPTION

The insulating material of this invention can be of any overall shape provided that it has a certain outer surface and a certain thickness. For example, FIGS. 1 and 2 respectively illustrate examples of standardized constructions of insulating materials of hollow cylindrical shape and flat-plate shape. In these examples, graphite sheets 1 are bonded on opposite surfaces of a carbon fiber felt sheet 2 by means of a carbonaceous binding agent (which is not shown since it impregnates the graphite sheets 1 and the felt sheet 2 and does not exist as a specific layer).

For the carbon fiber felt sheet 2, the felt sheet disclosed in the specification of the aforementioned Japanese Patent Publication No. 35930/1975 is preferably used. More specifically, a carbon fiber felt of a character such that its bulk density is within the range of 0.06 gram/cm.$^3$ to 0.10 gram/cm.$^3$, and the compression pressure necessary to compress the felt to twice this bulk density is from 100 grams/cm.$^2$ to 200 grams/cm.$^2$ is suitable for use in this invention. Fundamentally, the sheet thickness is not restricted, but a thickness of the order of from 5 to 25 mm. is desirable.

Depending on the necessity, the insulating material is so designed that, by laminating a plurality of these sheets, the temperature of the outer wall surface of the insulating material will not exceed 300° C. under general conditions of use. These base material sheets may be impregnated with a carbonizable resin, as described hereinafter, prior to the bonding thereto of the graphite sheets 1 or, further, this resin may be carbonized to give an impregnated carbon fiber sheet of Japanese Patent Publication No. 35930/1975.

For the graphite sheet 1, any flexible sheet comprising graphite particles bonded together and having a density of 0.6 to 1.6 grams/cm.$^3$ can be used. A graphite sheet of this character can be produced, for example, by extruding and rolling graphite powder which has been expanded by sulfuric acid treatment.

As mentioned above, it is desirable that the graphite sheet be one which has been formed by using no binding agent. The reason for this is that it may be considered that the graphite sheet, which contains no binding agent at all, or almost none, has some room, although very slight, in the voids between the graphite particles for impregnation thereinto of carbonizable resin liquor, and that this room for the impregnation is the physical reason that makes possible the bonding of the graphite sheet to the carbon fiber felt.

As suitable graphite sheet material, those sold on the market can be used as they are. Examples of such graphite sheets are those sold on the market, under commercial names such as "Graphoil" (manufactured by the Union Carbide Company, U.S.A.) and "Sigriflex"

(manufactured by Sigri Elektrographit GMBH, West Germany).

A suitable thickness of the graphite sheet is less than 1 mm., being preferably from 0.5 mm. to 0.2 mm. If the thickness is excessive, flexibility will be lost, and together with the small quantity of the carbonizable resin impregnating the graphite sheet, the adhesive bonding strength will be insufficient. Furthermore, the density of the graphite sheet is from 6 to 10 times that of the carbon fiber felt to be used in combination therewith. For this reason, it is not desirable to use a large quantity of the graphite sheet since the overall heat capacity and the heat transfer coefficient increase greatly, and the times required for cooling and raising the temperature of the furnace become long.

Next, the carbonizable resin is applied as coating on the surface or surface to be bonded of the above described carbon fiber sheet and/or graphite sheet and the two sheets are bonded together. For the carbonizable resin, any resin may be used provided that it exhibits a carbonization yield of more than 30 percent by weight in the case where it is heated and carbonized at a temperature up to 1,000° C. in an inert atmosphere. Examples of suitable resins are thermosetting resins such as phenolic resins, epoxy resins, and furan resins. Depending on the necessity, a resin of this kind is used in a solvent-diluted state wherein one part by weight thereof is dissolved in 0.8 to 3 parts, preferably 1.5 to 3 parts, by weight of a solvent. The use of a phenolic resin of resol type diluted in a lower alcohol such as methanol and ethanol is particularly advantageous because of facility in coating and impregnation and because of economy. It is possible also to use these alcohols by diluting them with water and using them in the form of diluted liquors. In this case, as long as the alcohol content is diluted liquor is above 40 percent by weight, no problems will be encountered in coating and impregnation.

In the impregnation of the carbon fiber felt sheet and/or the graphite sheet(s) with the carbonizable resin, the application as coating of the carbonizable resin in a quantity, as a resin content excluding the solvent, of 400 grams/m.$^2$ to 800 grams/m.$^2$ with respect to the bonding surface is desirable for obtaining a strong bond. Furthermore, the quantity of the carbonizable resin for this bonding should be held to a value such that, in the case where this carbonizable resin, or a carbonaceous binder as the carbonization product thereof, has been caused beforehand to impregnate the carbon fiber felt sheet, the bulk density of the ultimately obtained felt layer will be within the range of from 0.13 gram/cm.$^3$ to 0.20 gram/cm.$^3$.

Then, a complete bonding for hardening the resin in the bonded structure thus tentatively bonded is attained. The temperature for this hardening differs with the kind of resin, being of the order of, for example, 150° to 220° C. in the case of a phenolic resin of resol type. By imparting a compression force of from 50 to 300 gram/cm.$^2$, preferably from 100 to 200 gram/cm.$^2$ of the bonding interface of the bonded structure at the time of setting of this resin, good bonding of the graphite sheet and the carbon fiber felt sheet can be obtained. This pressure thus produces a good bond and, at the same time, corresponds substantially to the pressure required for obtaining a felt layer of a bulk density of from 0.13 to 0.20 g/cm.$^3$ from a carbon fiber felt sheet of a bulk density of 0.09 g/cm.$^3$, for example.

The bonded structure obtained in this manner is heated in an inert atmosphere to a temperature above the carbonization temperature of the carbonizable resin for bonding, for example, above 800° C. thereby to carbonize the resin and, further according to necessity, is subjected to graphitization, whereupon the laminated insulating material of this invention is obtained.

In the insulating material of this invention, the graphite sheet and the carbon fiber felt sheet must be in a state wherein they are bonded with ample bonding strength. Otherwise, the prevention of infiltration of the scattered material into the felt, which is a basic object, cannot be achieved, and, furthermore, in the case also where tightness of the entire outer surface of the felt is desired, the insulating material cannot be used with an adhesion in which separation or bond failure is liable to occur.

We have concluded that, unless the graphite sheet is bonded onto the surface of a carbon fiber felt with a carbonaceous adhesive, an amply high adhesive strength at high temperature cannot be obtained and have found that, as a method for bonding the graphite sheet to the carbon fiber felt, a dilute solution of the resin to be carbonized is caused to impregnate also a graphite sheet possessing tightness. This finding is a basis of this invention.

In this connection, while it is also possible to bond together two or more graphite sheets by the above mentioned method, the bonding interface thereof has almost no bonding strength. More specifically, the bonding strength between the carbon fiber felt and the graphite sheet in the claimed insulating material is amply high, without any separation between layers whatsoever, even when the bonded structure is subjected to more than 10 consecutive repetitions of temperature rise to 1,400° C. and cooling to room temperature in an actual vacuum furnace. In contrast, the bonding interface of mutually bonded graphite sheets is such that almost all parts thereof separate with only one cycle of temperature rise and cooling. This is due to the very small quantity of the resin to be carbonized which impregnates the graphite sheets.

Figure 2:
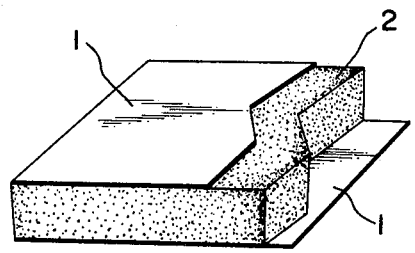
FIGS. 2, 4, 6, and 8 are perspective views, with parts cut away, respectively showing different examples of flat-plate-shaped structures of the multilayer formed insulating material of the invention.

While the construction of the insulating material and the process of producing the same of this invention have been described above with respect to the embodiments of the invention illustrated in FIGS. 1 and 2, the insulating material of the invention can be produced with various other constructions. For example, the insulating material according to this invention includes constructions wherein a carbon fiber felt is the basic material and graphite sheets are bonded to its entire outer surface and wherein at least one graphite sheet is bonded on only a specific portion of the basic material as necessary. In addition, the insulating material of the invention also includes those of sandwich constructions wherein one or more graphite sheets are interposed as reinforcing sheets between layers of carbon fiber felt sheets for use in ceilings of horizontal furnaces and in parts which must support loads.

A number of embodiments of this invention other than those illustrated in FIGS. 1 and 2 will now be described in conjunction with FIG. 3 and subsequent figures.

Figure 3:
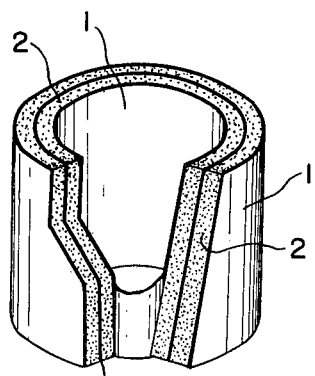
Figure 4:
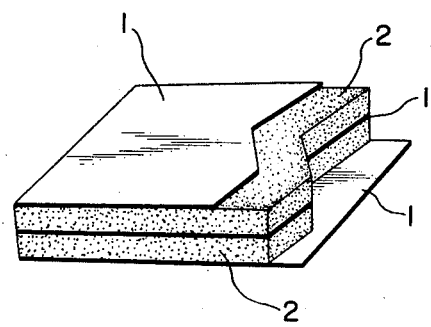

The insulating materials shown in FIGS. 3 and 4 are respectively in the form of a circular cylinder and a flat plate and respectively constitute examples wherein a graphite sheet 1 is used as a reinforcing member in the middle part of the cylinder wall and in the middle part, in the thickness direction, of the flat plate. In this case, the insulating material is of multilayer construction comprising two layers of the carbon fiber felt 2 and three layers of the graphite sheets 1.

Figure 5:
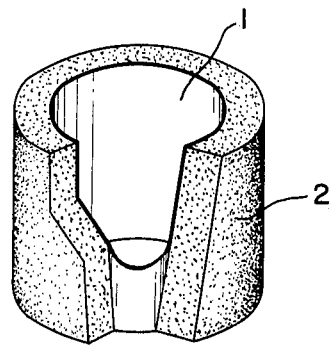
Figure 6:
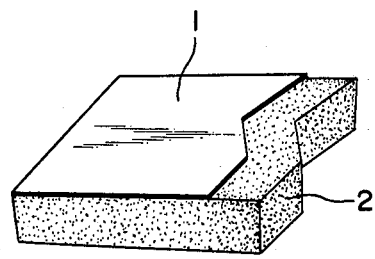

The formed insulating material of circular cylindrical shape and flat-plate shape as shown in FIGS. 5 and 6, respectively, illustrate examples of simplest constructions of formed insulating materials according to this invention wherein only one surface considered to require tightness (i.e., the surface constituting the inner wall surface of a furnace) in each case is made tight with a graphite sheet 1, each insulating material being of two-layer construction comprising a graphite sheet 1 and a carbon fiber felt sheet 2.

Figure 7:
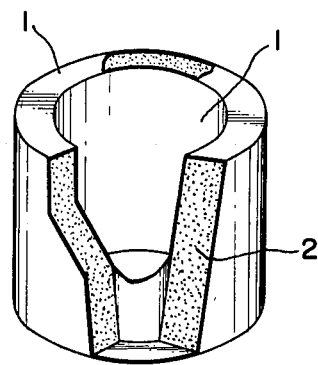
Figure 8:
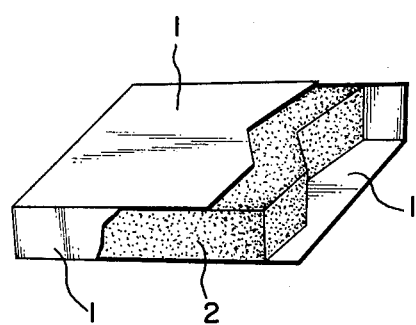

In each of the examples shown in FIGS. 7 and 8 of formed insulated materials respectively of circular cylindrical shape and flat-plate shape, pieces of graphite sheet 1 are bonded on all outer surfaces of a carbon fiber felt sheet 2 thereby to make tight the entire outer surface of the insulating material.

While some examples of constructional forms which the insulating material of this invention can take have been described above and shown in FIGS. 1 through 8, the constructional forms of the insulating material of the invention is not limited thereto, and it is to be understood that all possible constructions and shapes relating to insulating materials of multilayer construction comprising at least one layer of a graphite sheet and at least one layer of a carbon fiber felt are considered to fall within the purview of the meaning of the insulating material according to this invention wherein the graphite sheet and the carbon fiber felt are bonded by a carbonaceous binder.

Furthermore, in the above described examples, the carbon fiber felt layer 2 has been described as being a single layer, but it may be a laminated structure comprising a plurality of unit carbon fiber felt sheets as described hereinabove. It will be readily seen that in this case the aforedescribed carbonizable resin will function effectively in bonding these felt sheets to each other. As mentioned hereinbefore, the insulating material of this invention can be fabricated to have a construction wherein its entire outer surface is made tight by bonding graphite sheet to all edge surfaces.

The insulating material of this invention produced in this manner is used by installing in a heating furnace so that its surface covered by the graphite sheet becomes the inner wall surface of the furnace, that is, the surface facing the articles to be heated in the furnace. For example, an insulating material of hollow cylindrical shape such as that illustrated in FIG. 1, 3, 5 or 7 is inserted as is into a hollow cylindrical heating furnace and, depending on the necessity, can be combined with an upper cover comprising an insulating member of flat-plate shape or a bottom insulating material. An insulating material of flat-plate shape such as that illustrated in FIG. 2, 4, 6 or 8 in addition to being used for an upper cover of this character and the like, can be disposed in a combination of panels thereof to form the inner wall surface of a heating furnace of rectangular column type or box type. In any case, inlet and outlet openings for flow of gas, a material charging inlet opening, openings of installing the heating source, and the like are provided in the insulating material as necessary.

While the insulating material of this invention can be applied for use with nonoxidizing atmospheres such as a vacuum, an inert gas, or a weakly reducing gas, wherein there is no risk of combustion under heating, its use in a vacuum furnace is particularly advantageous. The reasons for this are as follows.

In a process wherein an inert gas is used, unless an inert gas which has been purified to a very high degree of purity is used, high quality of the heat-processed articles cannot be attained, and there are technical and economical difficulties in the reuse of the inert gas which has been used once. In contrast, processing under reduced pressure is equivalent to processing in an atmosphere of a very high purity, and, in addition, the advantages of small fluctuation of furnace temperature due to convection of the gas and low electric power consumption are afforded. Furthermore, because of the rapid progress in vacuum technology and the resulting relative ease with which desired degrees of vacuum can be obtained, the use of a vacuum furnace has become more advantageous than the use of a furnace with an inert gas also on the point of cost of production.

In order to indicate more fully the nature and utility of this invention, the following specific example of production of the insulating material of the invention and tests relating thereto are set forth, it being understood that this example and the details thereof are illustrative only and are not intended to limit the scope of the invention.

EXAMPLE

Carbon fibers of an average diameter of 12.5 microns were subjected to needle punching to make a felt sheet of a bulk density of 0.09 gram/cm$^3$ and a weight per unit area of 1,000 grams/m$^2$ (apparent thickness 12 mm.). This felt sheet was impregnated with an impregnation liquor prepared by dissolving a resol type phenolic resin in an equal weight of ethanol, the impregnation quantity being 300 grams of the resin per kilogram of the felt, and the felt thus impregnated was formed into cylindrical shape as shown in FIG. 1 with 5 laminated plies.

On one hand, a flexible graphite sheet of a thickness of 0.5 mm. was coated with the above mentioned resol type phenolic resin solution in a quantity of 600 grams of the resin per square meter of the adhesion surface. The graphite sheet thus coated was then caused to adhere to the inner surface and the outer surface of the cylindrical felt structure as shown in FIG. 1, and the resin was heated and set under a pressure of 150 grams/cm.$^2$, whereupon a cylindrical formed structure of a wall thickness of 30 mm. was obtained. This cylindrical structure was further heated at 2,000° C. for carbonization thereby to fabricate a cylindrical formed insulating material of a bulk density of its felt part of 0.15 gram/cm.$^3$.

When this cylindrical formed insulating material was used in a vacuum furnace for melting quartz and subjected to 30 cycles of heating to 1,400° C. and cooling to room temperature, no abnormality of this material was observed, and it was possible to use this material under the severe conditions for an insulating material for vacuum furnaces.

Furthermore, similar results were obtained when the above described procedure was carried out with a mixture liquor of 35 parts by weight of the resol-type phenolic resin and 100 parts by weight of ethanol instead of the above mentioned solution of equal weights of the resol-type phenolic resin and ethanol.

For comparison, a cylindrical formed insulating material fabricated in the above described manner except that no graphite was bonded thereto was subjected to the same test, whereupon an abnormal state of the temperature of the outer wall surface was observed after three cycles of the heating up to 1,400° C. and cooling to room temperature, and, at the fifth cycle, there developed an abnormal insulating characteristic wherein, when the temperature within the furnace was maintained at 1,400° C., the operational condition of maintaining the temperature at the outer wall surface below 300° C. could not be satisfied.

Furthermore, a cylindrical formed insulating material was made in the above described manner with a carbon fiber felt of 30-mm. thickness except that the graphite sheet was not bonded to the inner wall surface of the insulating material but was merely wound and thus attached thereto. This insulating material was similarly tested, whereupon the graphite sheet was found to deform with one cycle of temperature rise. At the second cycle of temperature rise, the deformation became large, and it became impossible to charge still unmelted raw material into the crucible, whereby it became necessary to remove the graphite sheet.

These results of tests and comparative tests indicate the excellent performance of the multilayer formed insulating material of this invention comprising combinations of carbon fiber felt and graphite sheet as described above.

What is claimed is:

1. A multilayer heat insulating material suitable for use in heating furnaces in which a non-oxidizing atmosphere is used, which insulating material comprises a sheet of carbon fiber felt having gas permeability, and a sheet of graphite having a thickness less than 1 mm. and a density of 0.6 to 1.6 grams/cm$^3$, bonded to at least one surface of the sheet of carbon fiber felt by means of a carbonaceous binder, the density of said graphite sheet being substantially greater than that of said felt sheet.

2. The multilayer sheet of claim 1 wherein the density of said graphite sheet is from 6 to 10 times that of said carbon fiber felt.

3. A multilayer heat insulating material as set forth in claim 1 in which: at least two superimposed sheets of the carbon fiber felt is used; a sheet of graphite is interposed between and bonded to each pair of adjacent sheets of the carbon fiber felt; and another sheet of graphite is bonded to at least on outer surface of the felt sheets constituting the outermost felt layers of the entire resulting laminated structure.

4. A multilayer heat insulating material as set forth in claim 1 in which the carbonaceous binder is a carbonization product of a carbonizable resin.

5. A multilayer heat insulating material as set forth in claim 1 in which the bulk density of the bonded carbon fiber felt sheet is from 0.13 to 0.20 gram/cm.$^3$.

6. A multilayer heat insulating material as set forth in claim 1 the entire shape of which is cylindrical.

7. A multilayer heat insulating material as set forth in claim 1 the entire shape of which is the shape of a flat plate.

8. A multilayer heat insulating material as set forth in claim 1 in which the graphite sheet has a density of from 0.6 to 1.6 grams/cm.$^3$ and is a flexible sheet comprising graphite particles in bonded state.

9. A process for producing a heat insulating material which comprises steps of:
   (1) forming a multi-layer structure comprising:
      (a) a sheet of gas permeable carbon felt having a bulk density of from 0.06 to 0.10 grams/cm$^3$ and a compressibility such that the force required to compress the felt sheet to twice said bulk density is from 100 to 200 g/cm$^2$ and
      (b) a sheet of graphite adjacent at least one surface of said carbon fiber felt, and
      (c) interposed between said sheet of graphite and said sheet of carbon fiber felt, a carbonizable resin,
   (2) hardening the carbonizable resin while applying a pressure of from 50 to 300 grams/cm$^3$ at the interface between said graphite sheet and said carbon fiber felt and
   (3) carbonizing said carbonizable resin to form said heat insulating material, material having a bonded multi-layer structure.

10. A process for producing a heat insulating material as set forth in claim 9 in which the carbonizable resin is a member selected from the group consisting of resins whose carbonization yield is more than 30 percent by weight when the resins are heated and carbonizied at a temperature up to 1,000° C. in an inactive atmosphere and liquors comprising the resins diluted in solvents.

11. A process for producing a heat insulating material as set forth in claim 10 in which the carbonizable resin is a member selected from thermosetting phenolic resins, epoxy resins, furan resins, and the like, and liquors comprising the thermosetting resins diluted in solvents each in a ratio by weight of from 0.8 to 3 of the solvent to 1 (unity) of the thermosetting resin.

12. A process for producing a heat insulating material as set forth in claim 11 in which the carbonizable resin is a member selected from phenolic resins of resol type and liquors comprising the phenolic resins diluted in lower alcohols.

13. A process for producing a heat insulating material as set forth in claim 9 in which, in step (1), the quantity of the carbonizable resin, excluding any solvent which may be associated therewith, is of the order of from 400 to 800 grams per square meter of the bonding area between the graphite sheet and the carbon fiber felt sheet.

14. A process for producing a thermally insulating material as set forth in claim 9 which further comprises, prior to step (1), a step wherein the gas permeable carbon fiber felt sheet is impregnated beforehand with the carbonizable resin.

* * * * *